Aug. 10, 1965  M. M. HURST  3,199,783
AUTOMOBILE POSITIONING DEVICE
Filed April 24, 1963  3 Sheets-Sheet 1
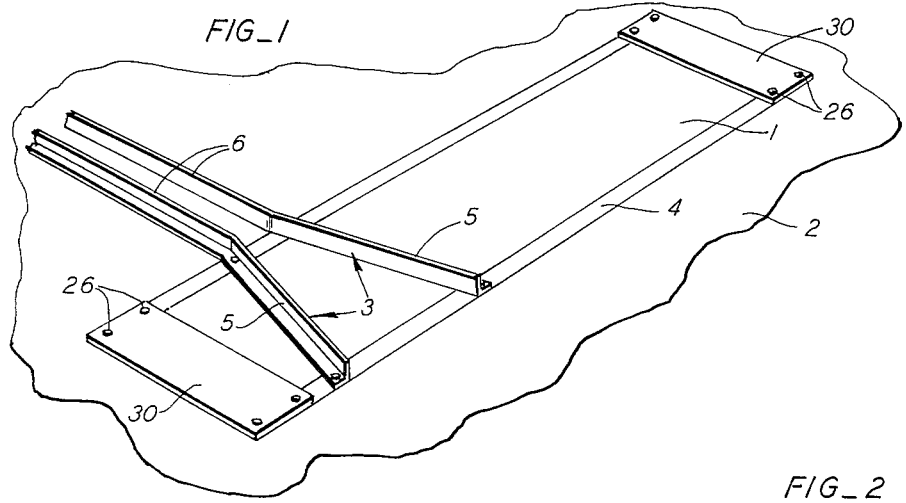
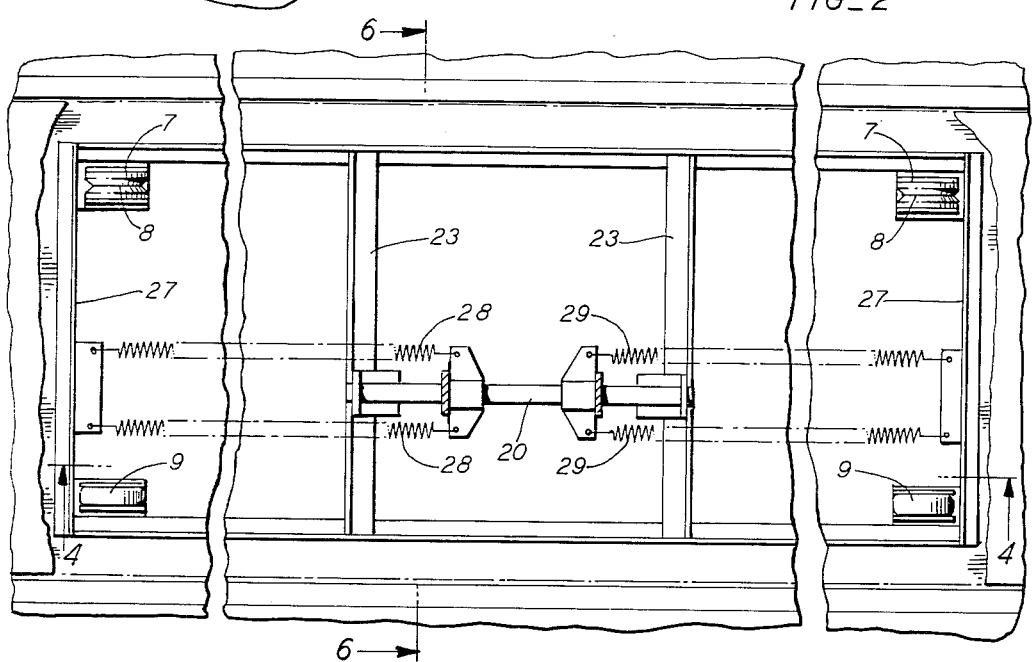
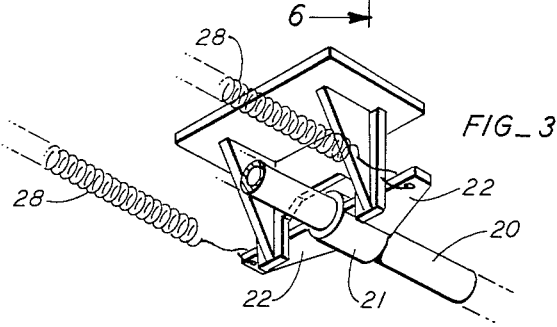
INVENTOR.
MOWATT M. HURST
BY
Boyken, Mohler + Foster
ATTORNEYS

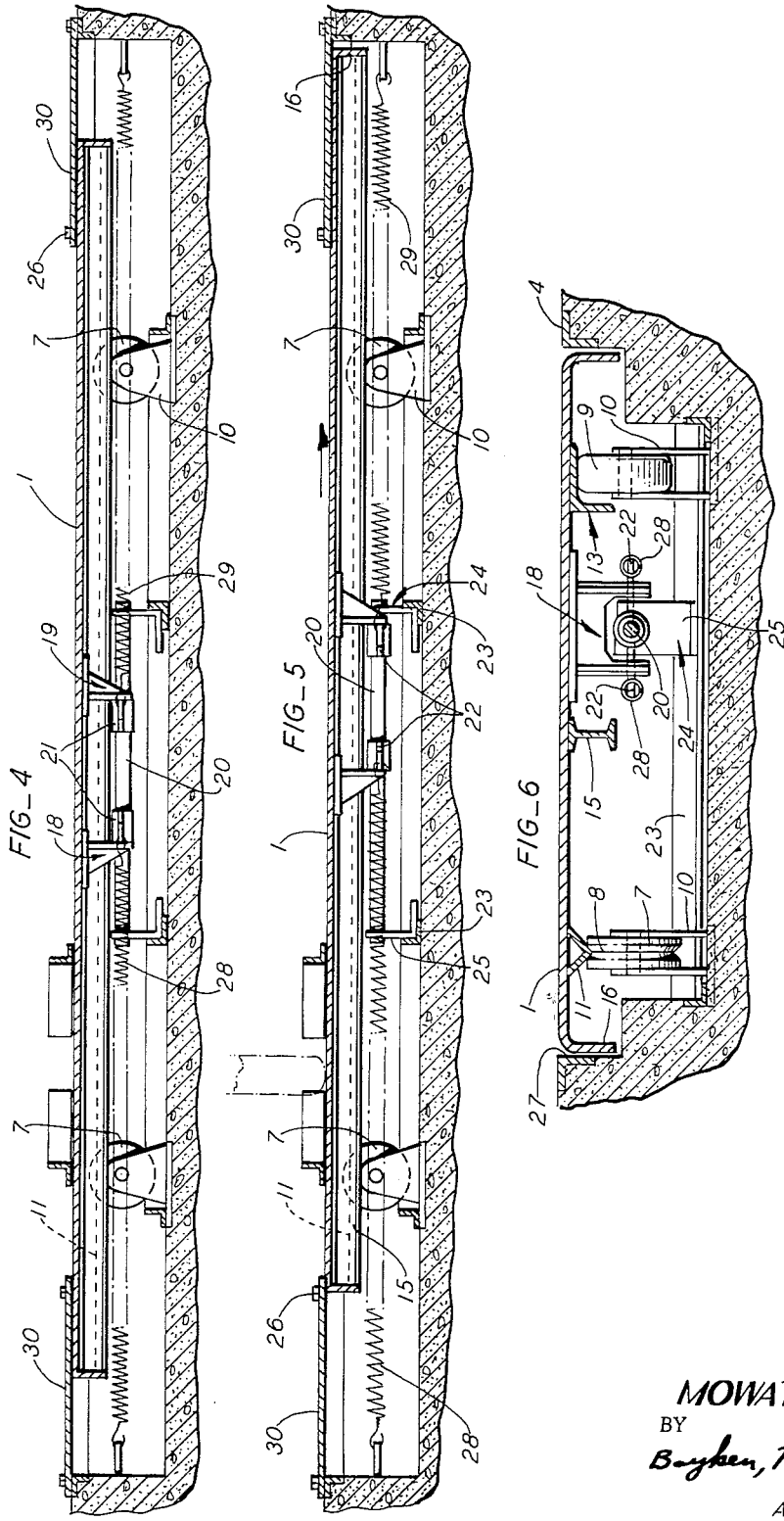

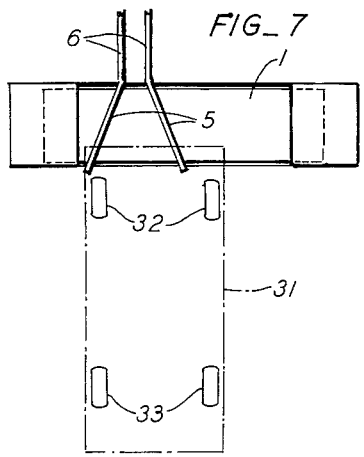
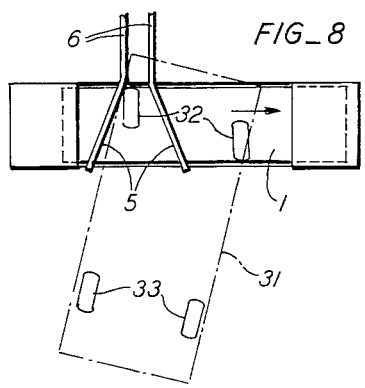
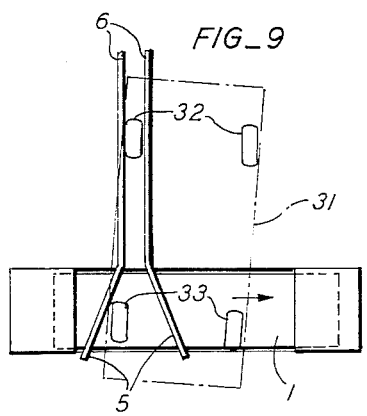
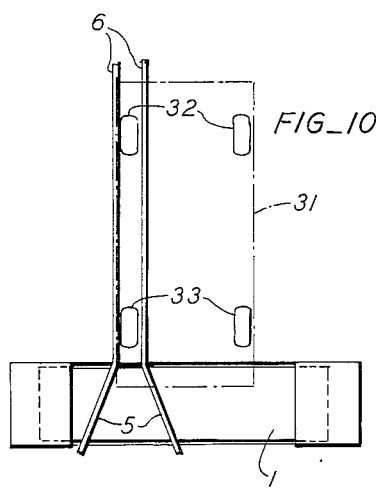
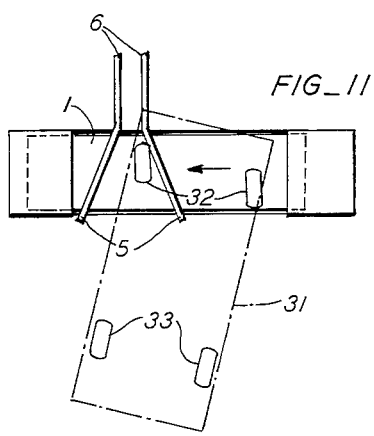
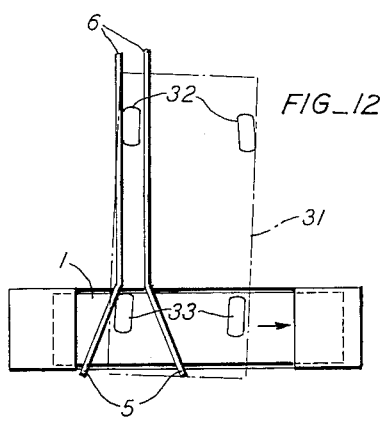

ns, to S. C. Johnson & Son, Inc., Racine, Wis.,
United States Patent Office 3,199,783
Patented Aug. 10, 1965

3,199,783
AUTOMOBILE POSITIONING DEVICE
Mowatt M. Hurst, San Carlos, Calif., assignor, by mesne assignme
a corporation of Wisconsin
Filed Apr. 24, 1963, Ser. No. 275,248
1 Claim. (Cl. 238—4)

This invention relates to an automobile positioning device, and has for one of its objects the provision of a device for automatically aligning the wheels of an automobile with respect to a straight path of travel, such as the path a car must follow in passing through a car washing installation.

Heretofore car sluing devices have been designed for actuation in swinging the rear wheels of a car in one direction only to align them with the front wheels, after the front wheels have entered and are being moved along the straight path of travel along which the rear wheels are to be moved.

One of the main objects of the present invention is the provision of means adapted to align the wheels of a car with the new straight path of travel irrespective of whether the wheels are offset to one side of said path or the other, and which means is adapted to be actuated by the front and rear wheels of the car.

Another object of the invention is the provision of improved means for cushioning the movement of the sluing plate upon its release and for automatically centering the plate on the device for actuation by the next wheel that is to pass onto the plate.

A still further object of the invention is the provision of a device that is substantially free from maintenance expense and that is economical to make and to install.

Other objects and advantages will appear in the description and in the drawings.

In the drawings, FIG. 1 is an isometric view of the aligning device as seen from above.

FIG. 2 is a top plan view of the portion of the device in which the top plate is broken away to show the structure that is below it, with the portions that connect with the top plate being indicated in cross section.

FIG. 3 is a fragmentary, isometric view of one of the yokes that is connected with the top plate, and that is slidable on a stationary, horizontal rod below said top plate.

FIG. 4 is a horizontal, cross sectional view taken along line 4—4 of FIG. 2 with the wheel supporting plate centered.

FIG. 5 is a cross sectional view that is similar to FIG. 4 but in which the top wheel supporting plate is moved to the right under the influence of a wheel that is indicated in dot-dash lines above said plate.

FIG. 6 is an enlarged, cross sectional view taken along line 6—6 of FIG. 2.

FIGS. 7–10 semidiagrammatically illustrate successive movements of the top plate of the car aligning device in which the approaching wheels are offset to the left of the conveyor or guide.

FIGS. 11–12 semidiagrammatically illustrate a condition in which the approaching front wheels are offset to the right of the top plate of the aligning device, while the rear wheels are offset to the left.

In detail, referring to FIG. 1, a horizontal, elongated, rectangular, wheel supporting plate 1 is provided, which plate is supported with its upper surface substantially flush with the ground 2 adjacent to said plate. A pair of horizontally extending guide rails 3 are rigidly secured to the stationary frame 4 in a position in which one of their end portions 5 extend transversely across one of the ends of the plate 1. Said end portions 5 extend convergently relative to each other from the wheel receiving, longitudinally extending edge of the plate to the opposed, longitudinally extending edge of said plate, and the convergent ends of said rails may then extend across the ground in parallel, spaced relation away from said plate and at right angles to the latter, said parallel portions being designated 6.

The portions 6 of the rails 3 define the initial path of travel that the wheels are to follow, and the left hand rail, as seen in FIGS. 1 and 7–12, may correspond to one of the rails in a conveyor system such as illustrated in my United States Patent No. 3,058,433 of October 16, 1962. The present invention is concerned with the aligning of the wheels in the position shown in FIG. 10 in the present application.

The platform or plate 1 is supported for longitudinal reciprocable movement on rollers 7 that are below the plate along one of the longitudinally extending edges of said platform, and rollers 9 that are along the other of said edges.

Rollers 7 each have a V-shaped annular outwardly opening groove 8 in the outer peripheral surface thereof, while each roller 9 has a substantially flat outer peripheral surface.

While there may be as many rollers as desired, usually two pairs are adequate, and these are supported on stationary bearings 10 for rotation about parallel axes extending transversely of the length of the plate 1. Said pairs are equally spaced from a medial line intermediate the ends of platform 1 when the platform is in a neutral position, and one roller of each such pair comprises a roller 7 and a roller 9 that are coaxial with each other. Thus the pair of rollers 7 along one longitudinally extending edge of platform 1 are coaxial with the rollers 9 along the other edge.

A V-shaped rib 11 (FIG. 6) is secured to the underside of platform 1 and may extend from end to end of the platform, with its apex received in the grooves 8, while a right angle strip 13 also secured to the underside of platform 1 and parallel with rib 11 has one leg flat against the underside of the platform. This leg is on the rollers 9, and angle strip 13 also extends substantially from end to end of the platform, while, as will later appear, the rib 11 and strip 13 could be in aligned sections instead of being continuous beneath each longitudinally extending marginal portion of platform 1, they materially reinforce the platform against distortion by a load thereon by extending the length of the platform. A central I beam 15 (FIG. 6) intermediate and parallel with the longitudinally extending edges of the platform and between rib 11 and strip 13 extends the full length of the platform and is a reinforcing beam, and flanges 16 integral with platform 1 may depend from all four edges of the platform to also strengthen the latter.

A pair of aligned yokes 18, 19 depend from and are rigid with the central portion of the platform 1, and which pair of yokes are equally spaced from a transverse medial line between the ends of the platform.

The arms of these yokes straddle a cylindrical rod 20 (FIG. 6) and each yoke carries a bearing 21 (FIG. 3) that is slidable on said rod 20. Horizontal arms 22 secured to each bearing secure the latter to the arms of each yoke, and also project oppositely outwardly from each yoke in a direction transversely of the rod 20.

As seen in FIGS. 4–6 there is a pit or recess beneath each platform, formed in the concrete that extends away from the edges of the platform to provide the ground surface that is substantially level with the upper surface of the platform, and the bearings 10 are secured to the bottom of this pit, while the frame 4 is secured to the concrete around the platform.

Also secured against the bottom of the pit are a pair of transversely extending, right angle strips 23 (FIGS. 2, 4) having one of their legs vertical and the other legs thereof extending toward each other and flat on the bottom of the pit.

A pair of right angle members 24 are secured to the strips 23 in the reentrant angle formed by the sides of said strips, said members having vertical legs 25 that are rigidly secured at their upper end to opposite end of the rod 20 by welding or any other suitable manner. The members 24 thus provide upstanding supports for the ends of rod 20, and when the platform 1 is in neutral position, as seen in FIG. 4, the pair of yokes 18, 19 is equally spaced between the pair of supports 24.

The ends 27 of the pit are equally spaced from the ends of platform 1 when the platform is in neutral position, and corresponding helical springs 28 of a pair thereof are secured to one end of the pit at one of their ends while springs 29 of a second pair are secured at one of their ends to the opposite end of the pit (FIG. 2). The other ends of springs 28, 29 are secured to the ends of the arms 22 that is nearest thereto. Since these springs are all the same and have the same tension they will yieldably hold the platform 1 in a neutral position.

The opposite end portions of the platform are covered by cover plates 30, irrespective of how far the platform is moved to the right or to the left, said cover plates being secured by stud bolts 26 or by any suitable means to frame 4.

Referring to FIG. 7, a car 31 is indicated in dot-dash line in a position moving, head on, toward the platform 1, but the front wheels 32 are offset so far to the left that the left front wheel will strike the left hand guide member 5 instead of directly entering the space between the parallel portions 6. Upon this occurrence, and when both front wheels are on platform 1, the front wheels will be slued to the right so that the front wheels will enter the space between the guide portions 6. As seen in FIG. 8, where the left front wheel 32 is about to enter the space between portions 6, the rear wheels 33 will tend to be centered as the car 31 progresses forwardly. However, complete alignment will not be possible in such a short distance in many instances and the left wheel 33 will also strike the left guide member 5 (FIG. 9.) When both rear wheels 33 are on platform 1 the rear of car 31 will be slued to the right and all four wheels will be in alignment as seen in FIG. 10.

The condition frequently occurs in which the left front wheel may strike the right guide portion (FIG. 11) in which the front end of the car will be slued to the left, and when the rear wheel 33 strikes the left guide portion 5, the rear end of the car will be slued to the right.

In addition to the very important fact that the platform 1 is adapted to move to the right and to the left so as to slue the ends of the car to the right or to the left, the arrangement of the springs 28, 29 is such that the return of the platform to neutral position after the passage of each set of wheels thereover is quick and free from shock. The springs are preferably under tension when the platform is in neutral position, and when, for example, the platform 1 is released from the right hand position shown in FIG. 5, the right hand springs 29 will function to absorb the inertia of the platform 1 upon said release.

I claim:

An automobile positioning device for moving the ends of automobiles of widely varying wheels gauges transversely of their respective longitudinal axes and for guiding the wheels at one side of each of such automobiles into alignment with a straight, horizontally extending path of travel that includes an upper surface for supporting the ground wheels of an automobile at said one side of said automobile for rolling thereover when said automobile is moved toward said path with its wheel at said one side of each of said automobiles offset to one side or the other of said path;

(a) means for defining said path of travel;

(b) a horizontal, elongated platform extending across one end of said path in adjacent relation thereto projecting a substantial distance oppositely outwardly of said path, and with its upper surface approximately flush with the upper surface of said path;

(c) means for supporting said platform from below for horizontal movement in two opposite directions relative to and transversely of said path from a stationary neutral position free from supporting any portion of an automobile thereon;

(d) means for yieldably holding said platform in said neutral position and for yieldably returning said platform to said neutral position upon movement of said platform longitudinally thereof in either of two opposite directions and release thereof after said last mentioned movement;

(e) a pair of substantially corresponding horizontally elongated guide rails substantially symmetrically positioned at opposite sides of an extension of the longitudinal axis of said path projecting above and adjacent to the upper surface of said platform and extending transversely completely across one end portion only of said platform from one longitudinally extending edge of said platform to the other and to the end of said path adjacent to said platform with said pair of rails extending divergently relative to each other from said one end of said path and spaced apart at their convergent ends substantially equal distances from the axis of said path at opposite sides thereof to successively pass only one of said ground wheels at a time at said one side only of said automobile to said path upon movement of said automobile across said platform to said path and with the other wheels at the other side of such automobile supported on the other end portion of said platform that is opposite to said one end portion and spaced from said rails, which other end is free of any wheel guides;

(f) said pair of rails having opposed surfaces above said platform extending convergently to said path to successively engage one or the other sides of said wheels at said one side only of said automobile when said last mentioned wheels are out of alignment with said path and the respective ends of said automobile are successively supported on said platform during movement of the automobile across said platform;

(g) said means for defining said path of travel comprising straight, horizontally extending stationary rails in continuation of said divergent pair of rails for guiding said wheels at one side only of said automobile along said path upon said last mentioned wheels leaving said platform, said continuation rails being of a length at least equal to the distance between the front and rear wheels of said automobile.

References Cited by the Examiner

UNITED STATES PATENTS

| 635,300 | 10/99 | Condict | 214—38.20 X |
| 2,010,462 | 8/35 | Nielsen | 214—38.24 X |
| 2,085,329 | 6/37 | Porte | 214—38.24 X |
| 2,607,536 | 8/52 | White | 214—16.10 |
| 2,924,389 | 2/60 | Anderson | 214—38.24 X |
| 3,033,129 | 5/62 | Grandpre | 214—38.24 X |

FOREIGN PATENTS 516,983  2/53  Belgium.

GERALD M. FORLENZA, *Primary Examiner.*

HUGO O. SCHULZ, *Examiner.*